L. BETHKE.
CLAMPING VISE.
APPLICATION FILED JUNE 10, 1916.

1,271,009.

Patented July 2, 1918.

Witnesses

Inventor
Leo Bethke
By Erwin & Wheeler
Attorneys

UNITED STATES PATENT OFFICE.

LEO BETHKE, OF MILWAUKEE, WISCONSIN, ASSIGNOR TO LUTHER GRINDER MANUFACTURING COMPANY, OF MILWAUKEE, WISCONSIN, A CORPORATION OF WISCONSIN.

CLAMPING-VISE.

1,271,009.  Specification of Letters Patent.  Patented July 2, 1918.

Application filed June 10, 1916. Serial No. 102,822.

*To all whom it may concern:*

Be it known that I, LEO BETHKE, a citizen of the United States, residing at Milwaukee, county of Milwaukee, and State of Wisconsin, have invented new and useful Improvements in Clamping-Vises, of which the following is a specification.

The object of my invention is to provide means for avoiding all machine work in the manufacture of an ordinary vise, except the screw cutting operation, whereby I am enabled to produce a simple and inexpensive form of vise which can be sold considerably below the price heretofore prevailing.

In a companion application bearing even date herewith, a method is illustrated and described whereby ordinary C clamps may be formed by casting upon a steel screw, a swivel head, a thumb nut, and a clamping yoke. This invention contemplates the provision of means whereby a vise, adapted to be secured to an ordinary work bench, may be constructed in a somewhat similar manner by casting the jaws of the vise upon a steel screw and upon one or more steel guide rods in such a relation that the screw may be employed for actuating one of the jaws along the guide rod.

In the drawings—

Like parts are identified by the same reference characters throughout both views.

Figure 1:
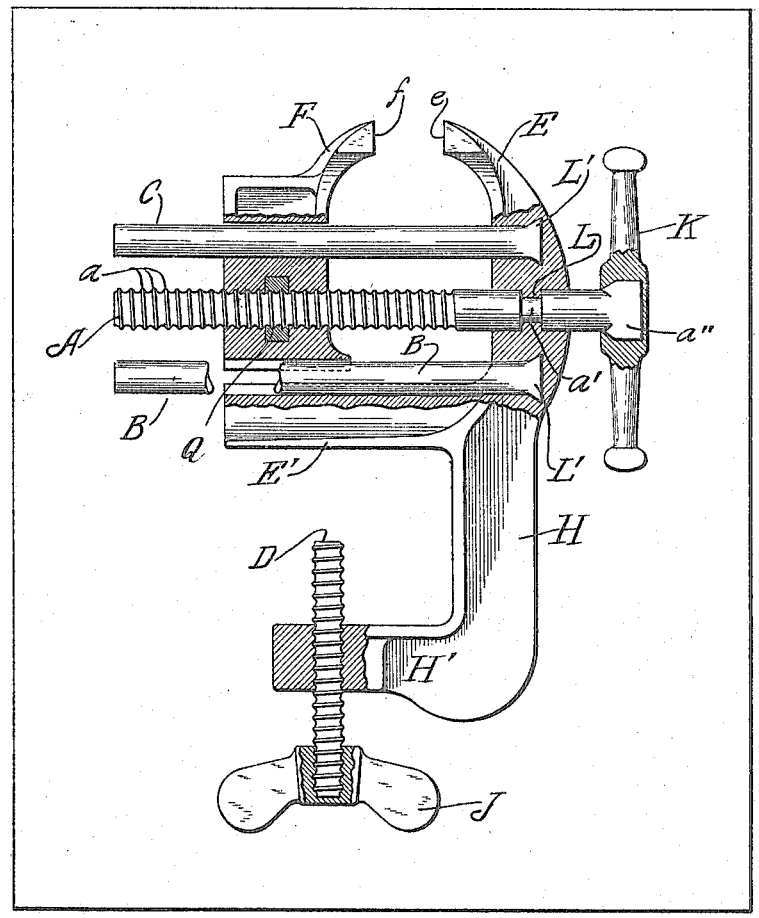
Figure 1 is a plan view of my improved vise as it appears in the mold after the flask has been removed, except that portions of the casting are shown in section to expose the screw bars and guide rods.

A jaw actuating screw bar A has a screw thread $a$ formed on one end portion thereof. The other end portion is cylindrical but is provided with an annular channel at an intermediate point which forms a neck $a'$. The extremity of this portion is preferably flattened to form a wing $a''$. This jaw actuating screw bar A may be placed in a mold with one or more parallel smooth surfaced rods B and C, which are suitably spaced from the screw bar A and extend from the vicinity of the neck $a'$ substantially to the threaded end of the screw bar. Another screw D is also preferably placed in the mold and in a position at right angles to the screw A, and the rods B and C are sufficiently distant therefrom to serve as a bench clamp screw. The mold will, of course, be provided with a cavity or cavities to receive the molten metal from which the cast metal portions of the vise are to be formed, as hereinafter explained.

A set of jaws E and F are then cast upon the screw actuating bar A and upon the rod or rods in such a manner that the jaw E will have embedded therein the neck portion $a'$ and parts of the screw bar A adjacent thereto, together with the adjacent ends of the rods B and C. The pattern for the jaw E is preferably formed with a portion corresponding to arm E' which partially embraces the rod B and supports the latter throughout a considerable portion of its length. The pattern for the jaw F is so formed that this jaw will have an intermediate portion of the rod C embedded therein, also an intermediate portion of the screw threaded part of the screw bar A, while the lower portion of the jaw F will embrace the upper portion of the rod B opposite the free end portion of the arm E'. The clamping faces $e$ and $f$ of the jaws E and F may be formed of cast metal, or, if desired, these portions of the jaws may comprise steel slugs placed in the mold and embedded in the jaws in the casting operation.

The clamping jaw or member E is also provided with a depending elbowed arm H, the horizontal portion H' of which embraces the screw D, whereby the screw is held in a position with its upper or inner end opposing the lower surface of the arm E'. The operating thumb nut J may be cast upon the lower end of the screw D and an operating lever K is preferably cast upon the wing $a''$. The jaws E and F, thumb nut J and lever K are cast by first assembling the screws in the mold in connection with suitable pattern members which are subsequently removed to form the mold cavity into which the molten metal may be poured in order to form the cast metal portions above described. The screws may be used as a part of the pattern or pattern screws may be used and replaced by the screws A and D preparatory to pouring the molten metal. The portions of the screws or screw bars, which are to rotate within the cast metal are preferably coated with molding shellac or equivalent material to prevent adhesion or fusion with the molten metal. The guide rods may be similarly coated. The molten metal will, of course, flow into the channel around the neck $a'$ and into the spaces between the screw threads, thereby forming female cast metal screw threads in the members F and H', and also forming an annular swivel flange L which encircles the neck $a'$.

Those portions of the rods B and C which are embedded in the jaw E, may, if desired, be provided with interlocking projections L' which may be conveniently formed by slightly flattening these ends of the rods. These portions of the rods will, of course, not be coated, but will be allowed to fuse or rigidly adhere to the cast metal.

Figures 2, 3:
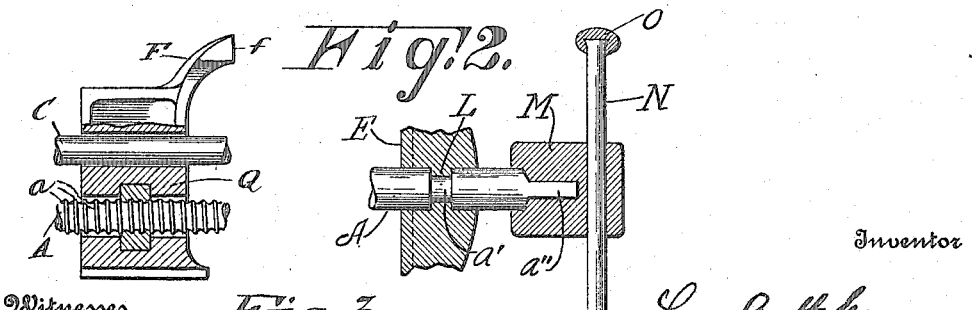
Fig. 2 is fragmentary view of the swivel end portions of the jaw actuating screw, showing also a fragment of the stationary jaw in vertical section, together with a modified form of operating lever.
Fig. 3 is a view, partly in vertical section, of the movable jaw, showing a modified form of construction.

Referring now to Fig. 2, it will be observed that the jaw actuating screw bar A has its flattened portion $a''$ embedded in a hub M and through which a rod N passes. This rod may also be formed of steel and assembled in the mold in the relation to the screw bar A in which it is shown in Fig. 2, after which the hub M may be cast thereon. Knobs O will also be preferably cast upon the respective ends of the bar N, and preparatory to the casting operation, the central portion of bar N may be coated with shellac to prevent adhesion in the hub M, whereby said bar N may be employed as a sliding lever, the movement of which through the hub, will be limited by the knobs O.

While I have described the clamping jaw F as the movable jaw and the jaw E as stationary, it will, of course, be understood that it is not material to my invention which of the jaws is actuated by the screw. If desired, a nut Q may be placed upon the screw bar A preparatory to adjusting the latter in the mold, the nut being so adjusted that it will be embedded in the jaw F when the casting is formed. Where this is done the jaw threads will be in part composed of cast metal and in part will comprise the threads of the nut, unless the screw threads are filled with molding sand and cement adjacent to the nut preparatory to the casting operation, in which case the only engagement of the jaw F with the screw will be through the medium of the nut threads. The nut, however, is not essential to my invention.

I claim—

1. A vise, comprising a steel screw bar provided with an unthreaded portion having a channel therein, in combination with a guide rod in parallel relation to said screw and spaced therefrom, a set of cast metal clamping jaws embracing said guide rod and screw bar, one of said jaws having an integral annular swivel flange permanently interlocked in said annular channel in the screw bar and the other of said jaws having integral cast metal threads engaging the screw threaded portion of said screw bar.

2. A vise, comprising a steel screw bar provided with an unthreaded portion having a channel therein, in combination with a set of guide rods in parallel relation to said screw and spaced therefrom, a set of cast metal clamping jaws embracing said guide rods and screw bar, one of said jaws having an integral annular swivel flange permanently interlocked in said annular channel in the screw bar and the other of said jaws having integral cast metal threads engaging the screw threaded portion of said screw bar, together with a cast metal handle member embracing the unthreaded extremity of the screw bar.

3. In a vise, a steel screw bar provided with an unthreaded portion having an annular channel therein, a flattened end portion, a body of cast metal completely encircling the channeled portion and the unchanneled portion adjacent thereto, and having a continuous integral cast metal tongue extending into said channel, said bar being rotatable in said body of cast metal, an operating bar crossing the end of the first mentioned bar, and a connecting body of cast metal in interlocking relation to the first mentioned bar and through which said operating bar extends and is adapted to slide in a longitudinal direction.

4. In a vise, a steel screw bar and a set of parallel unthreaded bars, a cast metal clamping jaw in which said steel screw bar is rotatably mounted and with which it is interlocked by a body of cast metal integral with the cast metal jaw, said parallel bars each having one end embedded in said cast metal jaw and integrally locked therewith to prevent rotation, and one of said parallel bars being supported on the side opposite the screw bar by a projection of said cast metal body which partially embraces said parallel bar.

5. In a vise, a steel screw bar and a set of parallel unthreaded bars, a cast metal clamping jaw in which said steel screw bar is rotatably mounted and with which it is interlocked by a body of cast metal integral with the cast metal jaw, said parallel bars each having one end embedded in said cast metal jaw and integrally locked therewith to prevent rotation, and one of said parallel bars being supported on the side opposite the screw bar by a projection of said cast metal body which partially embraces said parallel bar, together with a second cast metal clamping jaw embracing the other unthreaded bar and the threaded portion of the screw bar and having integral cast metal threads engaged between the threads of the screw bar, said last mentioned clamping jaw being movable along said bars.

6. In a vise, a steel screw bar and a set of parallel unthreaded bars, a cast metal clamping jaw in which said steel screw bar is rotatably mounted and with which it is interlocked by a body of cast metal integral with the cast metal jaw, said parallel bars each having one end embedded in said cast metal jaw and integrally locked therewith to prevent rotation, and one of said parallel bars being supported on the side opposite the screw bar by a projection of said cast metal body which partially embraces said parallel bar, together with a second cast metal clamping jaw embracing the other unthreaded bar and the threaded portion of the screw bar and having integral cast metal threads engaged between the threads of the screw bar, said last mentioned clamping jaw being movable along said bars, and also having a bearing upon the inner face of the third bar.

In testimony whereof I affix my signature in the presence of two witnesses.

LEO BETHKE.

Witnesses:
LEVERETT C. WHEELER,
IRMA D. BREMER.

Copies of this patent may be obtained for five cents each, by addressing the "Commissioner of Patents, Washington, D. C."